US011142290B2

(12) United States Patent
Stroo et al.

(10) Patent No.: US 11,142,290 B2
(45) Date of Patent: Oct. 12, 2021

(54) SELF-PROPELLED JACK-UP VESSEL

(71) Applicants: Ulstein Design & Solutions B.V., Rotterdam (NL); SeaOwls B.V., Rotterdam (NL)

(72) Inventors: Jacobus Dingeman Stroo, Delft (NL); Sjaak Jan Jiskoot, Rotterdam (NL); Erik Jacobus Bernardus Snijders, Gouda (NL)

(73) Assignees: Ulstein Design & Solutions B.V., Rotterdam (NL); SeaOwls B.V., Rotterdam (NL)

( * ) Notice: Subject to any disclaimer, the term of this patent is extended or adjusted under 35 U.S.C. 154(b) by 40 days.

(21) Appl. No.: 16/342,233

(22) PCT Filed: Oct. 18, 2017

(86) PCT No.: PCT/NL2017/050682
§ 371 (c)(1),
(2) Date: Apr. 16, 2019

(87) PCT Pub. No.: WO2018/074923
PCT Pub. Date: Apr. 26, 2018

(65) Prior Publication Data
US 2019/0322338 A1     Oct. 24, 2019

(30) Foreign Application Priority Data
Oct. 18, 2016  (NL) .................................... 2017637

(51) Int. Cl.
*B63B 35/44*       (2006.01)
*F03D 13/25*       (2016.01)
(Continued)

(52) U.S. Cl.
CPC .............. *B63B 35/44* (2013.01); *B63B 27/10* (2013.01); *F03D 13/25* (2016.05); *F03D 13/40* (2016.05); *B63B 2035/446* (2013.01)

(58) Field of Classification Search
CPC ... B63B 35/44; B63B 27/10; B63B 2035/446; F03D 13/25; F03D 13/44
See application file for complete search history.

(56) References Cited

U.S. PATENT DOCUMENTS

| 85,598    | A | * | 1/1869  | Lewis ................ E02B 17/0818 |
|           |   |   |         | 405/198 |
| 3,014,346 | A | * | 12/1961 | Small ................ E02B 17/0818 |
|           |   |   |         | 405/198 |

(Continued)

FOREIGN PATENT DOCUMENTS

| EP | 0094433 A | 11/1982 |
| EP | 2251254 A | 11/2010 |

(Continued)

OTHER PUBLICATIONS

Bushong, Steven: 'Six legged ship lends a hand to building offshore wind farms', Windpower Engineering & Development, Dec. 10, 2012, online, accessed Sep. 27, 2016.

(Continued)

*Primary Examiner* — S. Joseph Morano
*Assistant Examiner* — Jovon E Hayes
(74) *Attorney, Agent, or Firm* — N.V. Nederlandsch Octrooibureau; Catherine A. Shultz; Katelyn J. Bernier

(57) ABSTRACT

A self-propelled jack-up vessel has a centreline extending from a bow end to a stern end of the vessel along a central longitudinal axis, defining port and starboard sides of the vessel. The vessel comprises a hull, a deck and four retractable legs, which extend through the hull and the deck. The vessel includes a bow leg arranged on the centreline towards the bow, a stern leg arranged on the centreline towards the (Continued)

stern, and a starboard leg arranged at the starboard side. The diagonal placement of the legs, with respect to the centreline gives greater stability and flexibility. Further, a vessel is provided having a cruciform primary structural arrangement.

20 Claims, 8 Drawing Sheets

(51) Int. Cl.
  *F03D 13/40* (2016.01)
  *B63B 27/10* (2006.01)

(56) References Cited

U.S. PATENT DOCUMENTS

| | | | | |
|---|---|---|---|---|
| 3,082,607 | A * | 3/1963 | Sutton | E02B 17/0836 |
| | | | | 405/196 |
| 3,590,587 | A * | 7/1971 | Smulders | E02B 17/022 |
| | | | | 405/201 |
| 3,605,669 | A * | 9/1971 | Yu | B63B 1/107 |
| | | | | 114/122 |
| 4,455,109 | A * | 6/1984 | Lorenz | B63B 35/4413 |
| | | | | 114/288 |
| 4,657,437 | A * | 4/1987 | Breeden | E02B 17/0818 |
| | | | | 405/198 |
| 5,855,455 | A * | 1/1999 | Williford | E02B 17/021 |
| | | | | 405/196 |
| 6,523,491 | B1 * | 2/2003 | Moise, II | B66C 23/52 |
| | | | | 114/265 |
| 6,607,331 | B2 * | 8/2003 | Sanders | B66C 23/52 |
| | | | | 405/196 |
| 9,410,528 | B2 * | 8/2016 | Westergaard | F03D 13/10 |
| 2004/0237871 | A1 * | 12/2004 | Moise, II | B66C 23/52 |
| | | | | 114/265 |
| 2011/0139043 | A1 * | 6/2011 | Reed | E21B 15/006 |
| | | | | 108/139 |
| 2013/0115011 | A1 * | 5/2013 | Johnson | E02B 17/0836 |
| | | | | 405/196 |
| 2017/0073046 | A1 * | 3/2017 | Roodenburg | E21B 19/09 |
| 2019/0322338 | A1 * | 10/2019 | Stroo | F03D 13/25 |

FOREIGN PATENT DOCUMENTS

| | | | | |
|---|---|---|---|---|
| EP | 2868568 | A | | 5/2015 |
| KR | 1020120087722 | A | | 8/2012 |
| KR | 1020110128145 | A | | 6/2013 |
| KR | 1020120018706 | A | | 9/2013 |
| KR | 20130112535 | A | * 10/2013 | ........... E02B 17/021 |
| KR | 20130112535 | A | | 10/2013 |
| KR | 1020130018824 | A | | 9/2014 |
| KR | 20150002034 | | | 1/2015 |
| KR | 20150002034 | A | | 1/2015 |
| WO | 8301931 | | | 6/1983 |
| WO | 2004067375 | | | 8/2004 |

OTHER PUBLICATIONS

Ship Technology 'http://www.shiptechnology.com/projects/mpidiscoverywindturbineinstallationvessel/', Ship Technology Editorial Board, online, accessed Sep. 29, 2016.

* cited by examiner

SELF-PROPELLED JACK-UP VESSEL

FIELD OF THE INVENTION

The present invention relates to a self-propelled jack-up vessel. The vessel may be used for offshore construction activities, including wind farm installation and other activities requiring a stable lifting platform such as decommissioning and servicing. The invention also relates to new methods of performing such operations using the vessel.

BACKGROUND ART

Jack-up rigs are conventionally used for offshore drilling activities. Drilling jack-ups are frequently provided with three legs, which may be lowered on location to raise the platform to its operating height above the water level. They are generally non-propelled and must be towed by tugs while transported. A jack-up rig may be installed for a considerable period of time and although efficiency is always important, the installation itself is a relatively minor part of the overall operating time at a given site, which may be measured in weeks or months or even years.

Jack-up barges are also known. These may be considered as square or rectangular platforms, usually provided with a heavy-lift crane, from which stable lift operations can be performed e.g. during installation and construction activities offshore. Jack-up barges frequently have four legs at the corners of the barge and are usually towed into position using tugs. Recently, jack-up barges with their own thrusters have been proposed, allowing the barge to position itself and move short distances at low speeds. Nevertheless, jack-up barges are generally not suited to travelling any distance offshore and their use for transportation is therefore limited. For the purpose of wind-turbine installation, the time taken to move the jack-up barge from a first work site and install it at a second work site may be a significant part of the overall time. For installation of an offshore wind turbine 24 hours may be sufficient, given suitable weather conditions.

Jack-up vessels are self-propelled and may be self-installing on the work site without the requirement of tugs or further support. In recent years, jack-up vessels have been widely used to transport and install wind turbine generator components from port or from an intermediate supply facility to the work site. Since they may be required to travel relatively large distances offshore, they must be seaworthy even when fully loaded and must also be able to make reasonable headway.

Jack-up vessels are so called as the hull of the vessel can be lifted and lowered along the legs by use of jacking systems. During transport the legs are normally kept in a retracted position which helps to reduce water resistance. Once the vessel arrives at its destination or area of operation, the legs are lowered onto the seafloor to support the vessel in its elevated position. In order to ensure the safe and stable support of the vessel, a pre-loading process is carried out. Similar pre-loading procedures may also be used in the case of jack-up rigs and barges.

Pre-loading involves applying a weight to each leg in order to simulate the maximum load on this leg that could occur during operations. In this manner, the sudden and unexpected movement of the legs into the seafloor while operations are carried out is pre-empted.

Jack-ups with three legs are pre-loaded by taking on board large amounts of ballast water. This is time-consuming and adds significantly to the overall installation time. Jack-ups with four (or more) legs can use the mass of the jack-up hull to load individual legs to their pre-load values, which is a much quicker pre-load operation. For a four-legged jack-up, this will occur by putting all of the weight onto a first diagonal pair of legs. In this manner a loading of about twice the maximum load may be achieved. Then, the weight will be shifted to the second diagonal pair of legs. Once all four legs have been tested, installation can be completed by jacking down all four legs equally or according to a preferred weight distribution.

Self-propelled jack-up vessels with three, four and six legs are known. Vessels with four legs are most common, and although they have considerable advantages over jack-up barges in terms of their independence of operation, they also have a number of disadvantages. A main disadvantage of existing four-legged jack-up vessels is the relatively narrow spacing between the port and starboard legs. This is generally less stable than a wider barge and can lead to difficulties during pre-loading. Additionally, for a vessel carrying equipment for installation at a number of sites, the centre of gravity of the vessel may change after each installation. This requires ballasting with water to compensate for the load, adding time to the installation procedure. An additional significant disadvantage is the location of the main crane at one side of the vessel. In order to maximise the ability of the crane to access the deck area, it is conventional to locate the main crane around one of the legs. For a vessel with jack-up legs at the four quarters, the crane is usually located around the stern port or starboard leg. This immediately puts the crane off-centre, making balancing of the vessel complex. Use of the crane without the vessel being jacked is also generally not possible. A further limitation is that of the primary structural design. For a conventional vessel structure, the primary structure consists of fore-aft bulkheads and cross-wise bulkheads. A square frame structure joining the four legs may thus be provided but this may be considered sub-optimal for the purpose of loads between diagonally opposite legs, e.g. during pre-loading. Many or all of these aspects have a negative influence on the cost-effectiveness of the vessel, presented in the ratio of payload over vessel displacement. Scaling up the size of existing four or six-legged jack-up vessels to enable transport and installation of larger wind turbine generator components in the future will further decrease the cost-effectiveness of these vessels.

Another self-propelled jack-up vessel, described in patent publication U.S. Pat. No. 9,410,528, consists of a long ship-shaped hull with six legs symmetrically arranged about the centreline of the vessel. A main crane around one of the legs near the stern. The lack of structural hull stiffness and associated deformation of the hull in jacked position, is one of the reasons why six legs are required, as four legs would be insufficient to support the hull without sagging, in an elevated position. However, such a configuration has further drawbacks such as rather cumbersome crane lifting operations Thus, the known jack-up vessels suffer drawbacks such as cumbersome pre-loading and crane lifting operations which hinder their cost-effectiveness, as well as relatively weak main structures that limit their load capacity. Scaling up to larger dimensions will make these vessels even less cost-effective and limited.

Therefore, it is an object of the invention to provide a jack-up vessel with increased load capacity and cost-effectiveness. Further, it is an object of the invention to provide a self-propelled, jack-up vessel that can be used for offshore construction activities in general and for transport and installation of wind turbine generators in particular.

SUMMARY OF THE INVENTION

According to the present invention, a self-propelled jack-up vessel is provided, wherein a centreline extending from a bow end to a stern end of the vessel along a central longitudinal axis defines port and starboard sides of the vessel. The vessel comprises a hull, a deck and four retractable legs, which extend through the hull and the deck. The vessel includes a bow leg arranged on the centreline towards the bow, a stern leg arranged on the centreline towards the stern, a port side leg arranged at the port side and a starboard leg arranged at the starboard side. As used herein, bow leg refers to a leg that is located on the bow or bow area, or closest to the bow area, stern leg refers to a leg that is located on the stern or stern area, or closest to the stern area, port leg refers to a leg that is located on the port or port area, or closest to the port area, starboard leg refers to a leg that is located on the starboard or starboard area, or closest to the starboard area.

In the following, the term vessel will be used to distinguish over rigs, barges and platforms that are not generally intended to travel under their own propulsion for more than positioning purposes. The vessel may be provided with primary thrusters, such as fixed main propellers, that define the normal direction of forward motion and are thus aligned with the centreline of the vessel. Additional thrusters, fixed or directional, may be provided for positioning purposes. It is however not excluded that all of the propulsion is provided by directional thrusters or the like. In any case, the bow, stern and centreline of the vessel may be defined by the direction in which the vessel can achieve its highest sustained speed. Alternatively, the centreline may be defined as the longest dimension of the vessel or the longest waterline length of the vessel during transit.

One advantage of the proposed vessel configuration is that the layout of the legs allows for the hull to be supported by means of a cruciform primary structure. The primary structure may comprise bulkheads that run between the bow leg and the stern leg and between the port leg and the starboard leg. Such a cross-shaped or cruciform structural arrangement may provide a stronger and stiffer supporting frame than, e.g. a square or rhomboid-shaped frame, allowing for higher loads for a comparatively lightweight vessel. Importantly, the cross-shaped structure also provides good support of the deck cargo and self-weight of the unit in pre-loading conditions, when the weight is carried between diagonally opposed legs. Further, the cruciform primary structure allows for good possibilities to tune the distance between the bow and stern leg and between the port and starboard leg during the design phase. In this way the jack-up vessel dimensions can be scaled relatively easily. Also, the cruciform frame structure allows shifting of the position of the port and starboard legs relative to bow and stern legs. This may contribute to the most efficient deck layout and logistics.

The port and starboard legs are preferably located symmetrically about the centreline and may be located either equidistance between bow and stern legs or closer to one or the other. This will result in the legs being in either a square, a diamond (that is, the distance between the bow leg and the port and starboard legs may be greater than the distance between the stern leg and the port and starboard legs, or viceversa), or a kite shape. The vessel and its deck and hull may also have a similar shape although it will be understood that both the hull and the deck may depart from the outline defined by the legs. It is also noted that although reference is given to the legs being on the centreline, they need not actually intersect the centreline and could be placed alongside the centreline, without prejudice to the advantages described. This may be required or desirable for constructional purposes, e.g. in relation to a central bulkhead or if a spudcan on the centreline is to be avoided.

The resulting-shape of the jack-up vessel allows for a large width over length ratio compared to existing vessels. This results in a relatively constant and high intact stability for all tilting axes. It also allows a relatively high location of the main crane boom pivot point above deck level as compared to known vessels where the crane is located off the centreline. In the following, reference to the crane is intended to refer to the main crane, which will be the largest crane on the vessel. This may be a heavy-lift crane, which is defined in the industry and in the following as being a crane having a lifting capacity exceeding 140 tonnes. The ability to locate the crane boom pivot point higher above deck level means that there is more space below the crane boom in stored position and that the crane can reach higher with the same crane boom length. In particular, the boom may be transported in a horizontal configuration with storage clearance under the full length of the boom. In existing configurations, upward inclination of the boom was required to allow storage beneath the end of the boom. Thus, a vessel with high intact stability is provided with increased deck cargo capacity, and increased lifting stability/loading capability afloat.

As indicated above, the hull and deck may differ in shape to the square, diamond or kite shaped configuration of the legs. Preferably, the hull is streamlined with a bow that extends to a point. The bow may subtend an angle of less than 90°, at least over the first 20 metres of the vessel, taken at the waterline. More preferably, the bow may subtend an angle of less than 80°. The stern of the vessel may be blunt or square, in particular above the waterline at deck level. Below the waterline, the hull may be suitably streamlined, depending on the configuration of the propulsion units. In one embodiment, the deck of the vessel may be bottle or pear-shaped, with a relatively broad stern and a relatively narrow bows. The stern starboard and port quarters may be generally straight and angled from the beam to the stern. This allows the vessel to come alongside a quay with either of these three sections, namely stern first or port or starboard stern quarters and load or unload the vessel, using the heavy lift crane as will be further described below.

The shape of the hull also allows for a better housing of the spudcans in the hull. As a result, the spudcans can be increased in size which allows the vessel to visit offshore locations that might otherwise have been considered unsuitable. In general, the spudcans may be integrated into the hull in a streamlined manner, such that they lie flush with the hull profile. They may be located in regions where the hull is substantially horizontal and below the waterline. It is however not excluded that the port and starboard legs pass through the hull above the waterline. The vessel hull may in fact be of a sufficient size to provide for spudcans having a diameter of as much as 20 metres. For round spudcans, this will amount to a weight bearing area of more than 300 $m^2$. Preferably, the elevated weight divided by spudcan area is lower than 40 $t/m^2$, and more preferably as low as 35 $t/m^2$.

In an embodiment, the bow and stern legs are located substantially opposite each other along the centreline, i.e. substantially on opposite ends of the centreline. It will be understood that either one or both of the bow or stern legs may be slightly offset from the centreline, without departing from the scope of the invention. The bow leg and stern legs may also be arranged offset from the centreline to different sides thereof, while maintaining a balanced arrangement between these legs. Thus, the location of the legs can be altered without departing from the scope of the invention, to allow for accommodation of a load as necessary.

In the embodiment disclosed, the vessel comprises just four legs as this is considered the most effective configuration. Nevertheless, it is not excluded that further legs may be provided, while still maintaining certain of the advantages described above and hereinafter In an embodiment, the port and starboard legs are each arranged at a substantially equal distance from the centreline. The port and starboard legs may be arranged along substantially opposite ends of an axis horizontally traversing the vessel between the outermost points of the port and starboard sides, or may each be arranged slightly offset from such an axis while maintaining a balanced arrangement between these legs.

In an embodiment, the legs may comprise open-truss lattice structure of any suitable material. Alternatively, the legs may comprise tubular columns of any suitable material, in particular steel.

For use as a wind turbine installation vessel, it may be desirable to have the distance between the bow and stern legs slightly larger than that between the port and starboard legs, to attain a diamond shape. It would then be possible to stow, e.g., wind turbine generator blade racks fully supported on the deck, away from the installation side of the crane and in between the legs which will be within reach of the main crane. This also significantly increases the variable deck load (VDL) capacity of the vessel when compared to known vessels. In another variation, it may be possible to provide the blade rack on a hang-off structure over the stern of the vessel.

In an embodiment, the hull has a beam or maximum width (W) and a maximum length (L) such that a width-to-length ratio W/L is at least approximately 0.5 but which may be greater than 0.6 or even greater than 0.7. Other W/L ratios may be used without departing from the scope of the invention although, the W/L ratio will always be less than 1 if the centreline is determined by the longest dimension.

In an embodiment, a crane is arranged around the stern leg. The base of the crane may be arranged so that it surrounds the opening for receiving the stern leg. However, the crane is not supported by the stern leg and it does not interfere with the normal operation of the stern leg. The location of the crane around the stern leg allows for heavy components of the deck cargo to be stowed at the centre of the deck, which coincides with the centre of the legs, without the risk of sagging of the hull. Importantly, the crane can access the whole of the stern of the vessel and the port and starboard stern quarters.

Such a crane may be referred to as the main crane. Additionally, the vessel may be provided with additional cranes, or auxiliary cranes. The provision of auxiliary cranes may advantageously accelerate transport and/or installation operations. The crane(s) may be used to lift objects from the vessel's own deck, or from work or supply vessels, barges or fixed structures. It is of course not excluded that the vessel is provided with two heavy lift cranes of similar dimensions that can work in tandem.

In preferred embodiments, the main crane is arranged on the centreline. This is advantageous as it is the position which least affects the centre of gravity of the vessel. It also ensures that the deck load can be placed symmetrically, since there is no longer a need for it to balance or otherwise be accessible to an offset crane.

In another embodiment, the vessel may comprise a moonpool passing through the hull of the vessel. The moonpool may be located at the centre of buoyancy of the vessel. Such a vessel may serve for additional functions, in particular for subsea operations. The location of the moonpool at the centre of buoyancy provides for a stable structure both in elevated and lowered positions. Should it be required, a derrick may be provided either fixed or movable over the moonpool.

As discussed above, the vessel finds particular application as a wind turbine installation vessel. Nevertheless, the skilled person will be well aware of the many other advantages that can be achieved by such a versatile and stable vessel configuration. In particular, the rapid deployment of the legs, including pre-loading, allows the vessel to be easily and quickly moved from one location to another. This may allow for construction, servicing and decommissioning work to be carried out from different sides of a structure. Such work may then be completed with a smaller vessel or crane than might have previously been required for a barge located at a single location.

In another embodiment, the vessel may comprises an accommodation module and the vessel may be an accommodation platform. It will be understood that even when configured as an installation vessel, there may be a need for an accommodation module. However, the vessel may also find utility where accommodation is the primary function, especially given that the stability of the vessel in both jacked and floating configurations makes it safe and versatile.

The invention also relates to a method of operating a jack-up wind turbine installation vessel comprising; at a first installation location, jacking the vessel by lowering a first pair and second pair of retractable legs onto the seafloor; applying a pre-load, maximally equal to the full weight of the vessel, on said first pair of retractable legs aligned with a first axis of the vessel; releasing the pre-load applied on the first pair of retractable legs; applying the pre-load on a second pair of retractable legs aligned with a second axis of the vessel, and releasing the pre-load applied on the second pair of retractable legs, wherein the first and second axes are a centreline of the vessel and a beam of the vessel.

The method may further comprise moving the vessel to a second installation location, the vessel moving in a direction of its centreline, and jacking the vessel at the second location without taking on additional ballast. This advantage may be achieved due to the fact that deck load on the vessel may be installed close to the centre of gravity and the centre of legs. As such, the vessel may remain balanced even after a part of the deck load has been installed.

The method may also comprise, prior to arriving at the first installation location, mooring the vessel at a quay with one of its stern quarters at the quayside and loading wind turbine components onto the deck of the vessel. As discussed above, loading of the vessel in this manner allows optimal operation of a heavy lift crane that may be provided at the stern of the vessel. Because of the inherent stability of the vessel and the central location of the crane, loading may even take place without deployment or pre-loading of the legs.

According to a further aspect of the invention, there is provided a self-propelled jack-up vessel having a cruciform primary structure. Such a structure in combination with jack-up legs provides for greater structural stability of the vessel in both a jacked and floating configuration.

In one embodiment, the cruciform primary structure comprises a first member defining a centre line of the vessel and a second member defining a beam of the vessel, the first and second members being relatively narrow compared to their length. The first and second members may be single bulkheads and may be open or closed. The skilled person will understand what is meant by a primary structure in the context of ship building, being the structure from which all other structures are supported.

In one embodiment, the first and second members cross each other at right angles at a centre of buoyancy of the vessel.

In a further embodiment, each of the first and second members comprises first and second parallel bulkheads. The first and second parallel bulkheads may be spaced apart by a suitable distance by means of secondary bulkheads, trusses or the like. In one embodiment, the vessel is provided with four retractable legs and the bulkheads encircle respective legs. In the case that a moonpool is provided at the centre of buoyancy of the vessel, this may pass through the intersection of the first and second parallel bulkheads. The vessel may further comprise secondary structural members supported from the cruciform primary structure, with the deck and the hull being supported by the secondary structural members.

BRIEF DESCRIPTION OF THE DRAWINGS

The present invention will be discussed in more detail below, with reference to the attached drawings, in which.

DESCRIPTION OF EMBODIMENTS

Figure 1:
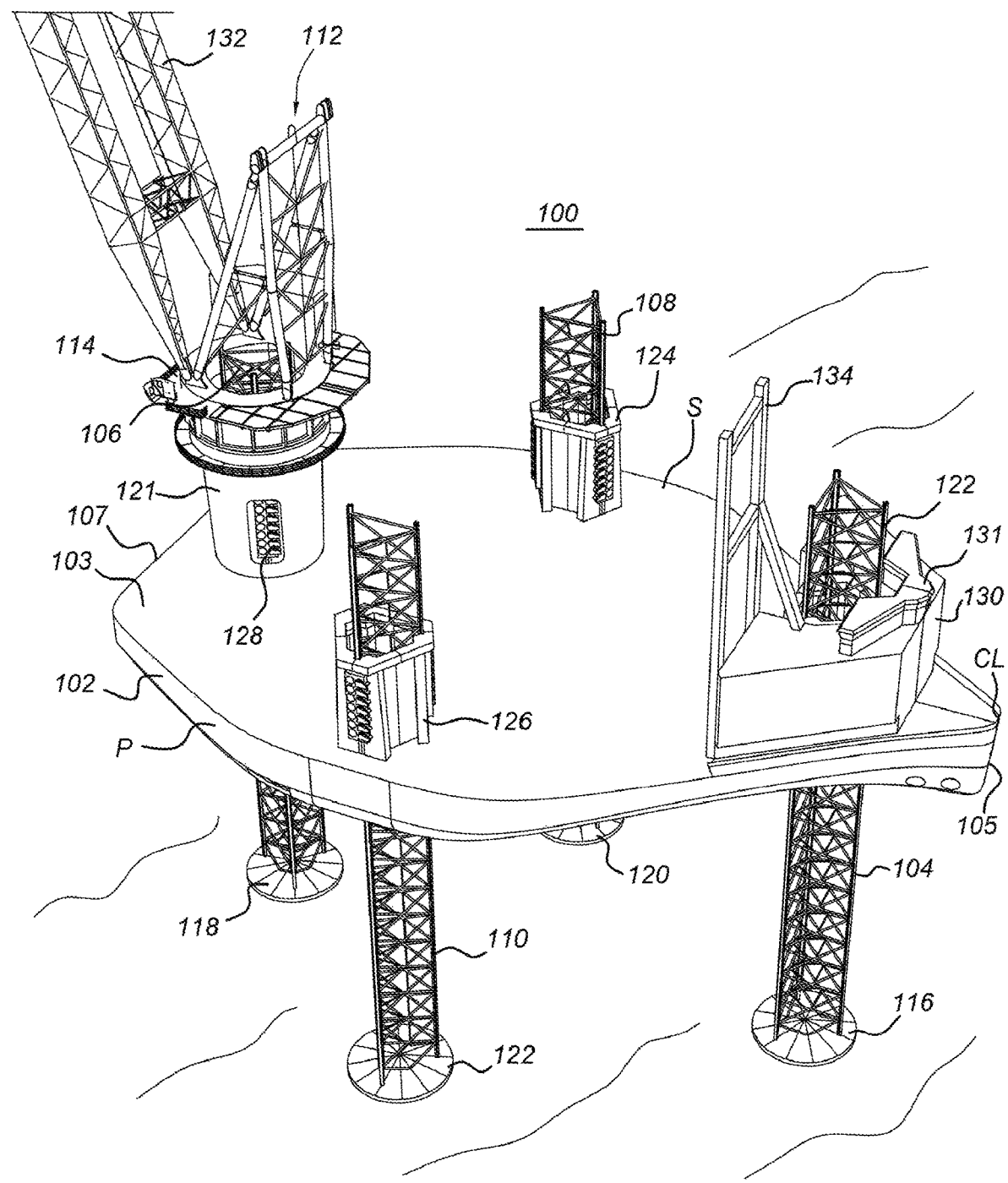
FIG. 1 schematically depicts a perspective view of the jack-up vessel according to the invention.

FIG. 1 shows a self-propelled, jack-up vessel 100 according to an embodiment of the invention. The vessel 100 is provided with a hull 102 and a deck 103.

A centreline CL extends from the bow 105 to the stern 107, defining the direction of travel of the vessel, and dividing the vessel into two main sides, namely the port side P and the starboard side S.

Four legs extend through the hull 102 and deck 103, namely a bow leg 104, a stern leg 106, a port leg 108, and a starboard leg 110. The legs 104, 106, 108, and 110 are shown in their deployed position, in which they extend downwards towards the seabed (not shown). They may be partially or fully retracted to a position in which they extend further above the deck 103 via jacking systems 122, 124, 126, and 128, respectively.

The legs 104, 106, 108, and 110 are fitted with spud cans 116, 118, 120, 122, respectively, for supporting the leg on the seabed.

A main crane 112 is mounted around the stern leg 106 via a crane base 121, and has a crane boom pivot point 114, by which a boom 132 connects to the crane base 121. At the bows 105 there is located a hotel or accommodation module 130 and the bridge 131. Behind the accommodation module 130 is located a boom support 134 for receiving the boom 132 during transit.

Figure 2:
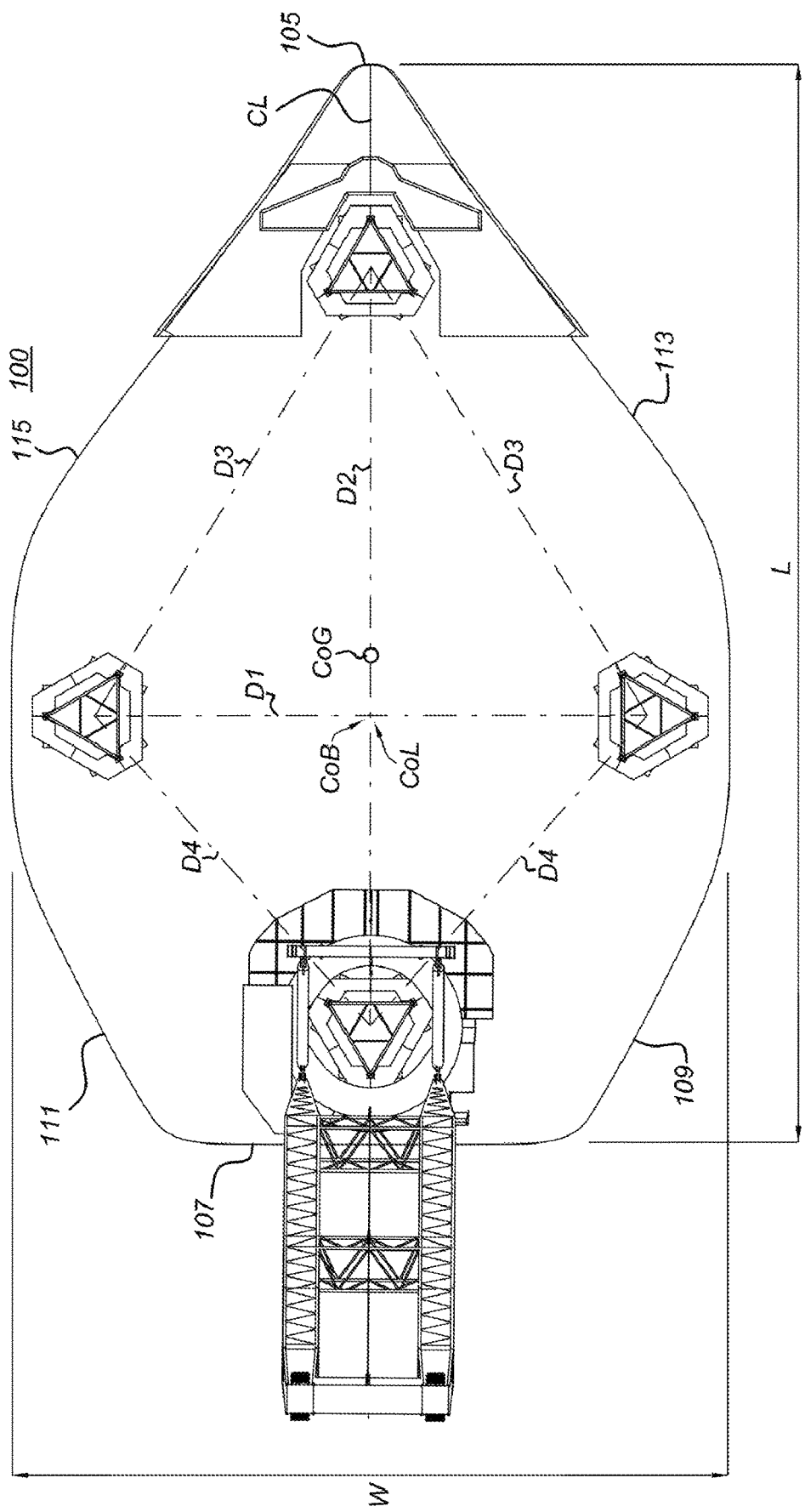
FIG. 2 schematically depicts a top view of the jack-up vessel of FIG. 1.

FIG. 2 shows a top view onto the deck of the vessel 100 of FIG. 1, showing a number of the dimensions that define its configuration. In this view, W is the maximum width, or the width of the vessel at its widest point (also known as the beam). L is the maximum length of vessel (also known as the length overall or carlin) from bow 105 to stern 107. In this configuration, the centre of buoyancy CoB coincides with the centre of legs CoL, although this need not necessarily be the case. The centre of gravity CoG may be located elsewhere, depending on the loading of the vessel. In the present example, the CoG is located slightly forward of the CoB. A ratio W/L defines the general shape of the vessel. For the illustrated vessel, the length L is 156.8 metres and the width is 104 metres and the W/L ratio is approximately 0.66. The vessel 100 has a maximum laden weight of 52 000 tonnes. These are representative values for use with present wind turbine generators. The skilled person will understand that for wind turbine installation, the vessel may scale as such components vary in size and that smaller vessels may be used for smaller wind turbines, e.g. on inshore waters. Other vessel dimensions may also be applicable to other operations.

D1 denotes the distance between the port leg 108 and the starboard leg 110. D2 denotes the distance between the bow leg 104 and the stern leg 106. D3 denotes the distance between the bow leg 104 and the port/starboard legs 108/110. D4 denotes the distance between the port/starboard legs 108/110 and the stern leg 106. In the illustrated embodiment, D1 is 80 metres, D2 is 110 metres, D3 is 76.3 metres and D4 is 60.2 metres. The legs may be defined to be in a kite configuration with the narrow part of the kite towards the bows 105. Also visible in this view are the stern 107, the port-stern quarter 109 and the starboard-stern quarter 111, the port-fore quarter 113 and the starboard fore-quarter 115. These are relatively straight sections of the vessel 100, provided for coming alongside a quay or another vessel as will be described further below.

Figure 3:
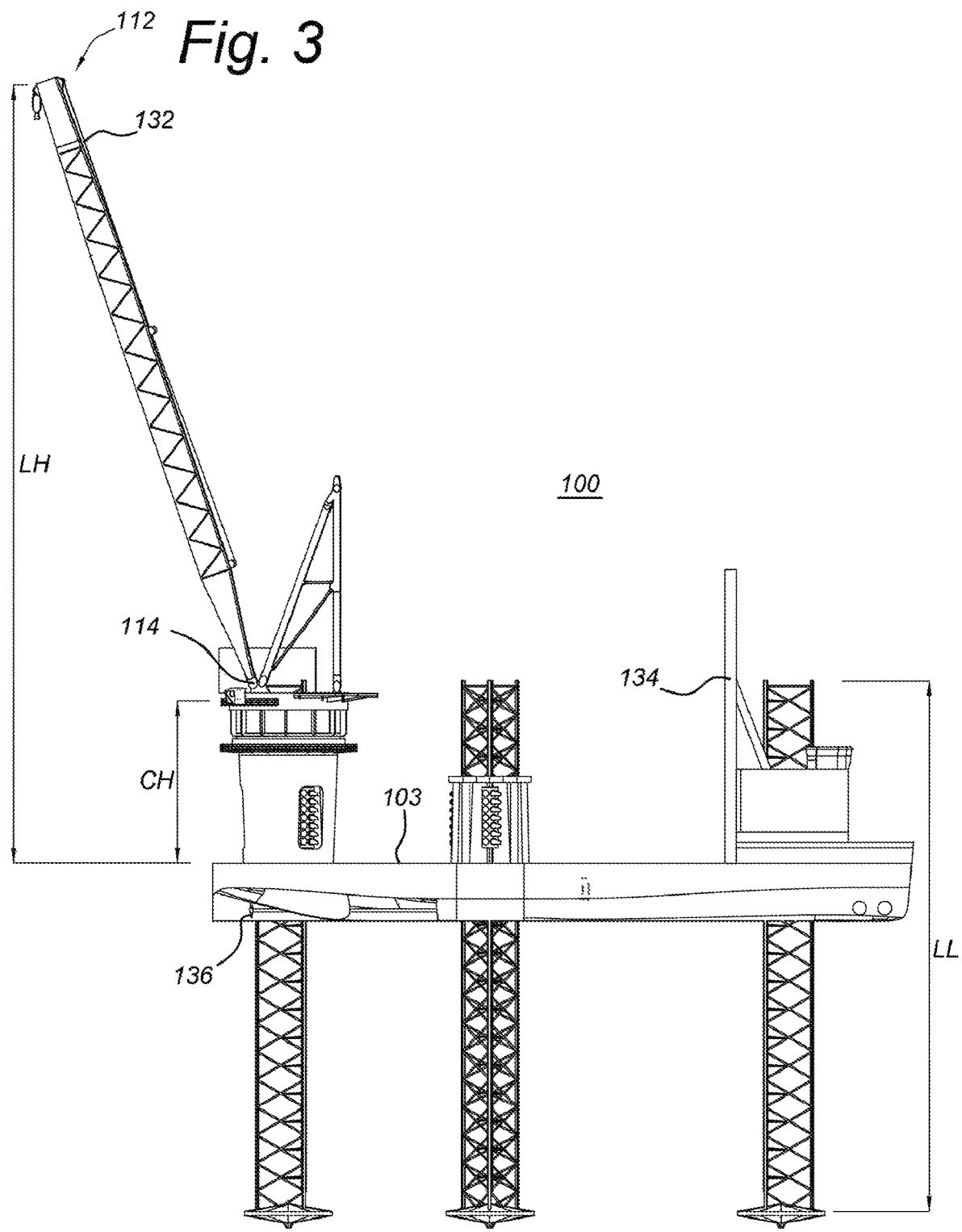
FIG. 3 schematically depicts a side view of the jack-up vessel of FIG. 1.

FIG. 3 shows a side view of the vessel 100 including the main crane 112. A height HC denotes the distance between the deck 103 and the crane boom pivot point 114 between the crane base 121 and the crane boom 132. LL denotes the height of the legs 104, 106, 108 and 110. LH denotes the lift height of the main crane 112 in relation to the deck level 103. Also visible in this view is the main propulsion unit 136, comprising twin propellers parallel with the centreline CL of the vessel. Bow thrusters 138 are also provided.

Figure 4:
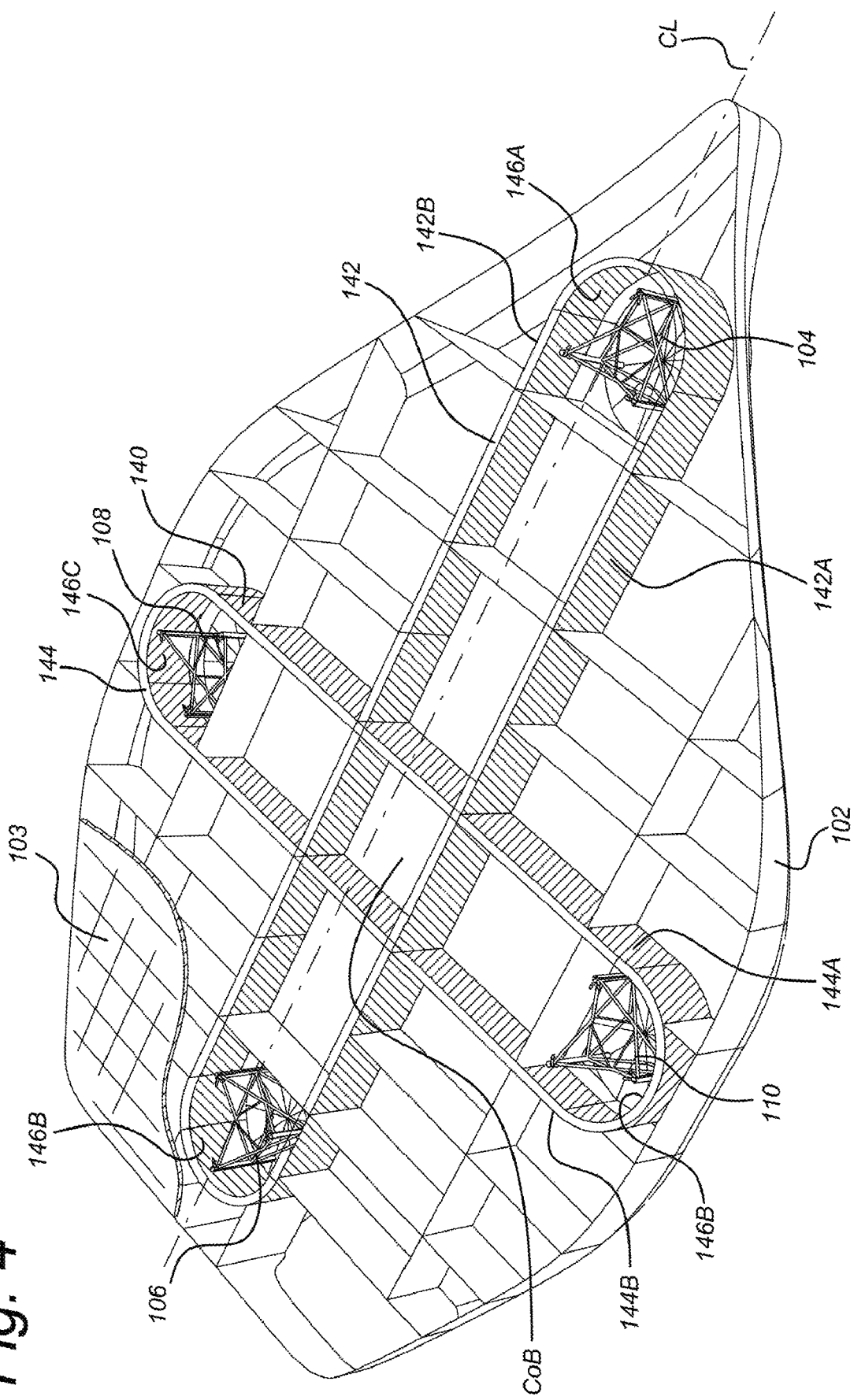
FIG. 4 schematically depicts a cutaway perspective view of the interior of the hull of the vessel of FIG. 1.

FIG. 4 shows a perspective cut-away view of the interior of the hull 102 with the deck 103 partially removed, showing the structure below. The vessel is constructed around a cruciform primary structure 140 comprising a first member 142 along the centreline CL and a second member 144 across the beam. The first and second members 142, 144 cross each other at right angles at the centre of buoyancy CoB of the vessel and comprises first and second parallel bulkheads 142 A, B and 144 A, B respectively. Each of the first and second members 142, 144, terminates at and surrounds a respective leg 104-110 to form a leg opening 146 A-D. It will be understood that the leg openings 146 A-D extend through the vessel from the hull 102 to the deck 103 and are sealed to the interior of the vessel. The spudcans 116-122 close the respective openings 146 A-D when the legs 104-110 are in their retracted positions.

The structure includes a number of secondary bulkheads 148 that attach to the cruciform primary structure 140 and to one another. The hull 102 and the deck 103 support on and are connected to the secondary bulkheads 148. The skilled person will understand the distinction between these two forms of structure, each of which is subject to different regulations in relation to construction, testing and subsequent adaptations It will also be understood that the vessel will include lower decks parallel to the deck 103, which may also be referred to as the weather deck.

Figure 5:
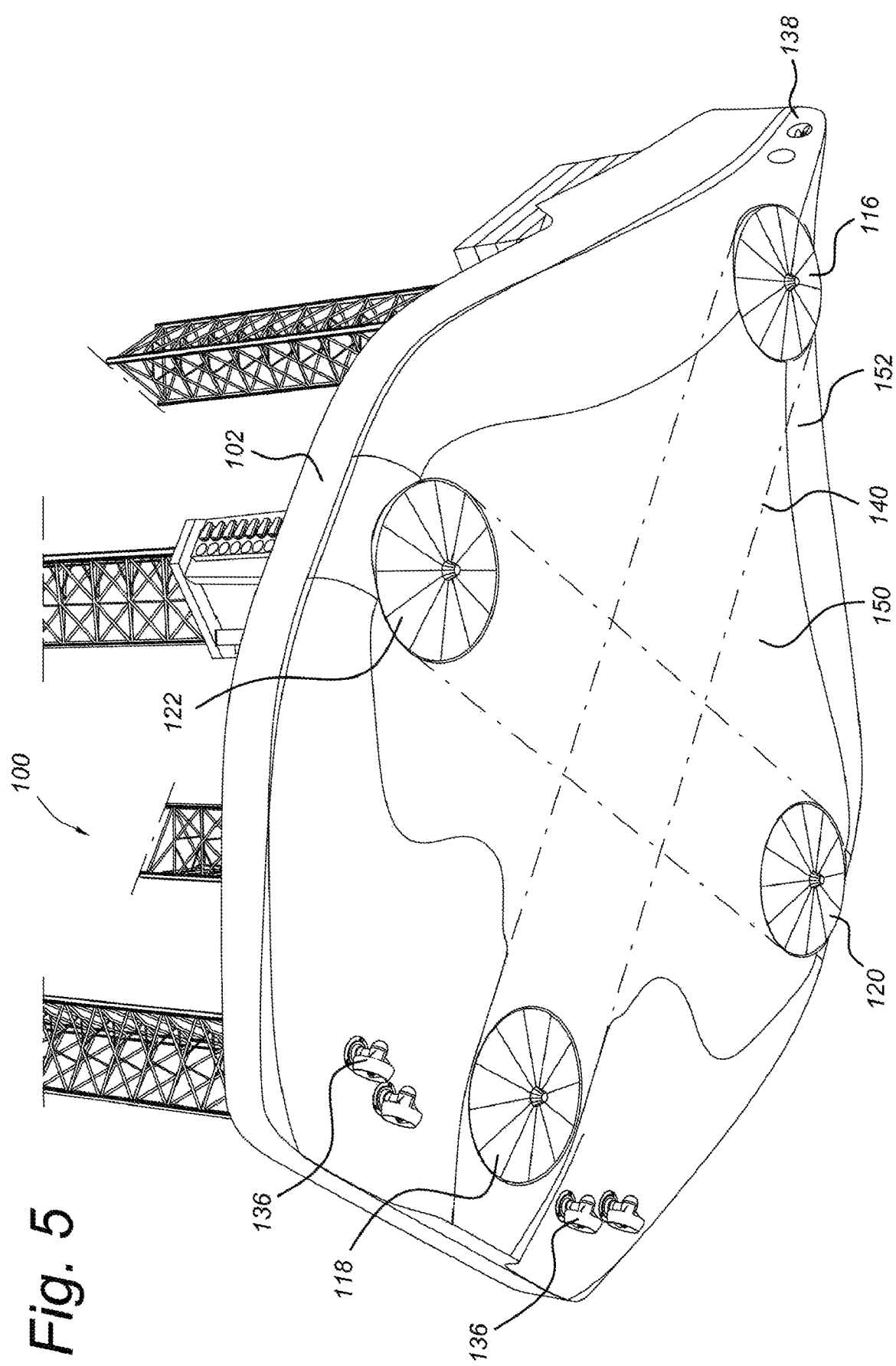
FIG. 5 schematically depicts an underside perspective view of the jack-up vessel of FIG. 1.

FIG. 5 shows a perspective view of the vessel 100 from beneath the hull 102. In this view, the underside of the spudcans 116-122 can be clearly seen, as can the streamlined shape of the hull 102 beneath the waterline. The hull 102 has a generally flat bottom 150, with a spade-shaped (alternatively eye-shaped) envelope 152, corresponding in size to the area covered by the cruciform primary structure 140. The spudcans 116-122 are recessed into the flat bottom 150 and form a substantially continuous surface therewith. They are circular, with a diameter of 20 metres and each has a surface area of around 314 $m^2$. The total weight bearing surface of the four spudcans is around 1256 $m^2$. For a vessel laden weight of 40 000 tonnes, this makes for a loading of just 32 tonnes/$m^2$, allowing the vessel to stand and operate in areas previously inaccessible to many jack-up vessels. Also visible in this view are the main propulsion unit 136 and bow thrusters 138.

Figure 6:
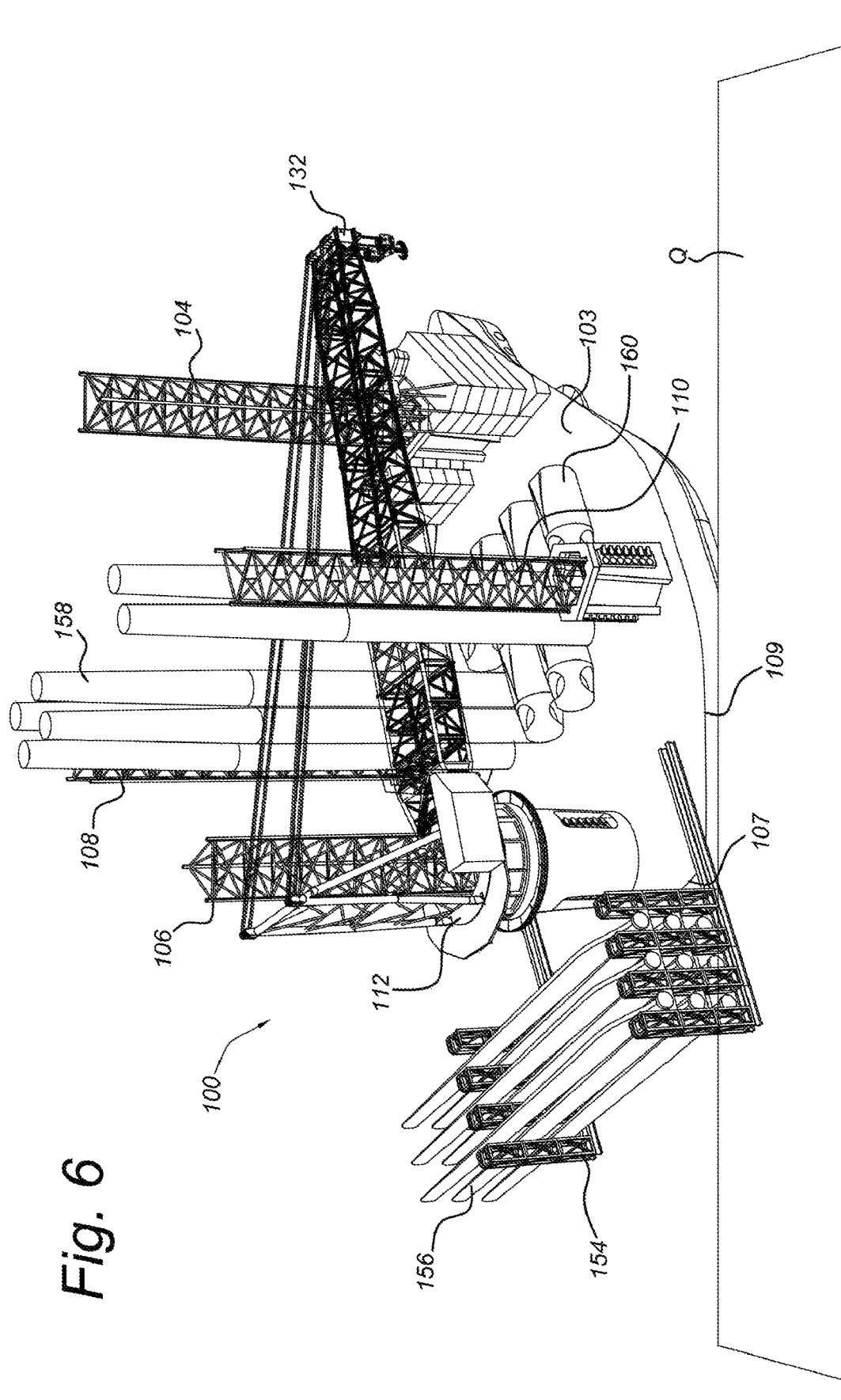
FIG. 6 schematically depicts a perspective view of the jack-up vessel of FIG. 1 during a loading operation.

FIG. 6 is a perspective view of the vessel during a loading operation at a quayside Q. The legs 104-110 are deployed such that the crane 112 can be operated to its full capacity. Lowering the legs 104-110 also has the advantage that the rotation of the crane boom 132 is less impeded by e.g. the starboard leg 110. The vessel 100 is moored with its starboard stern quarter 109 against the quay Q. In this position, the crane 112 is close to the quay Q and can lift to its full capacity from the quayside that is adjacent to the vessel. A storage rack 154 for wind turbine generator blades 156 is located in hang-off position at the stern 107 of the vessel, directly accessible below the crane 112.

As a consequence of its construction, the vessel 100 has a large open deck 103 onto which the further components of a number of wind turbine generators can be loaded, including masts 158 and nacelles 160. The masts 158 may be stowed in one piece vertically, which considerably facilitates handling. A considerable advantage of the invention over prior designs is that the crane 112 is located along the centreline CL. The deck load may therefore be placed centrally and may be loaded and unloaded in a symmetrical manner without significantly shifting the centre of gravity CoG of the vessel. Conventional vessels with an off centre crane have needed to place cargo on the opposite side of the vessel to compensate the weight. This causes the centre of gravity of the vessel to change, each time an item is unloaded or installed, requiring the addition of ballast.

Figure 7:
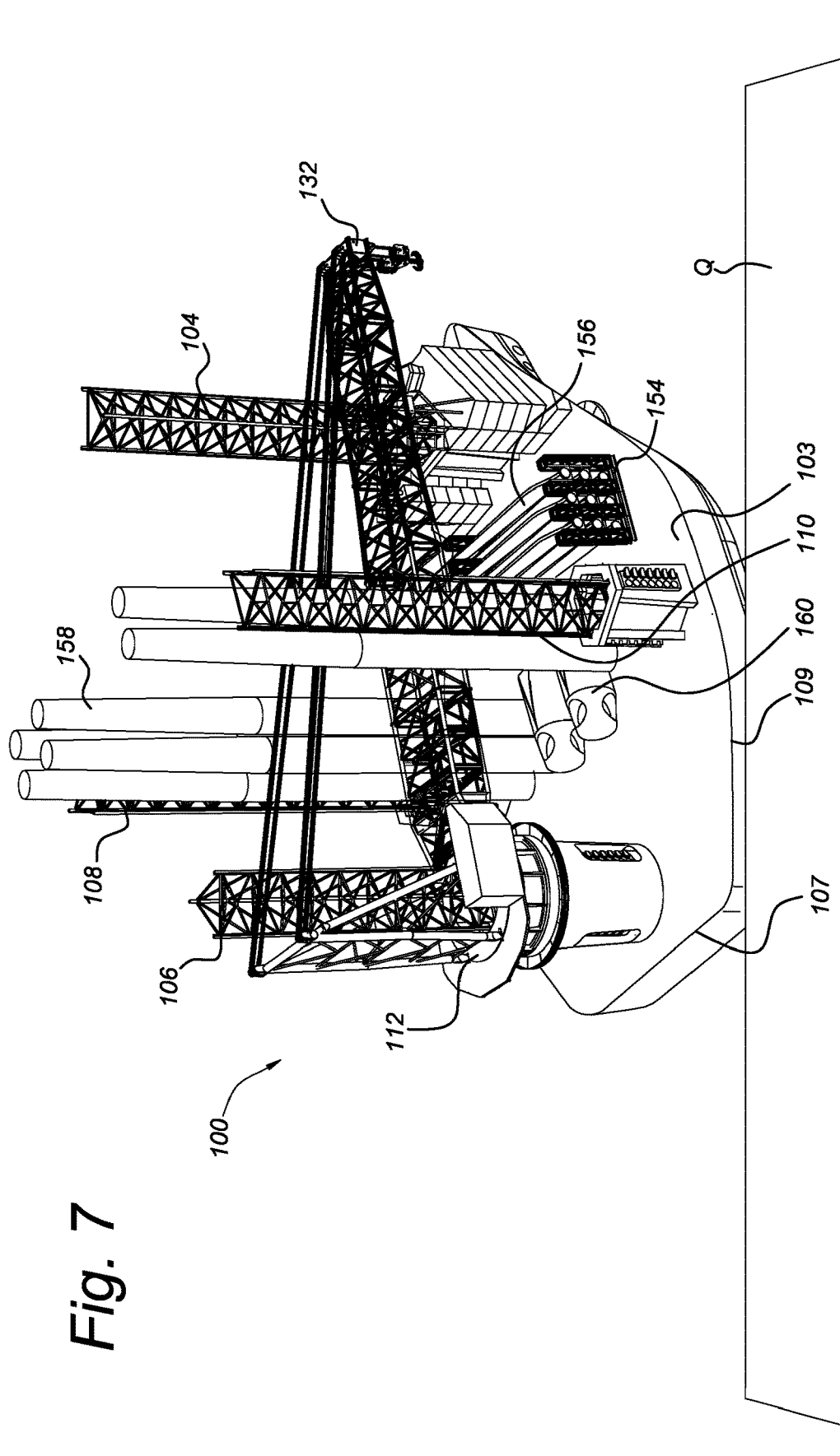
FIG. 7 schematically depicts a perspective view of the jack-up vessel of FIG. 1.

FIG. 7 shows a similar view to FIG. 6, with the storage rack 154 for wind turbine generator blades 156, provided on board the vessel 100. The vessel 100 is ready to put to sea, with the legs 104-110 raised and the boom 132 resting on the boom rack 134. Due to the height of the crane boom pivot point 114, the boom 132 is horizontal at a height of 40 metres above the deck 103. This allows adequate space beneath the boom 138 over its whole length for deck cargo, in particular the storage rack 154.

Figure 8:
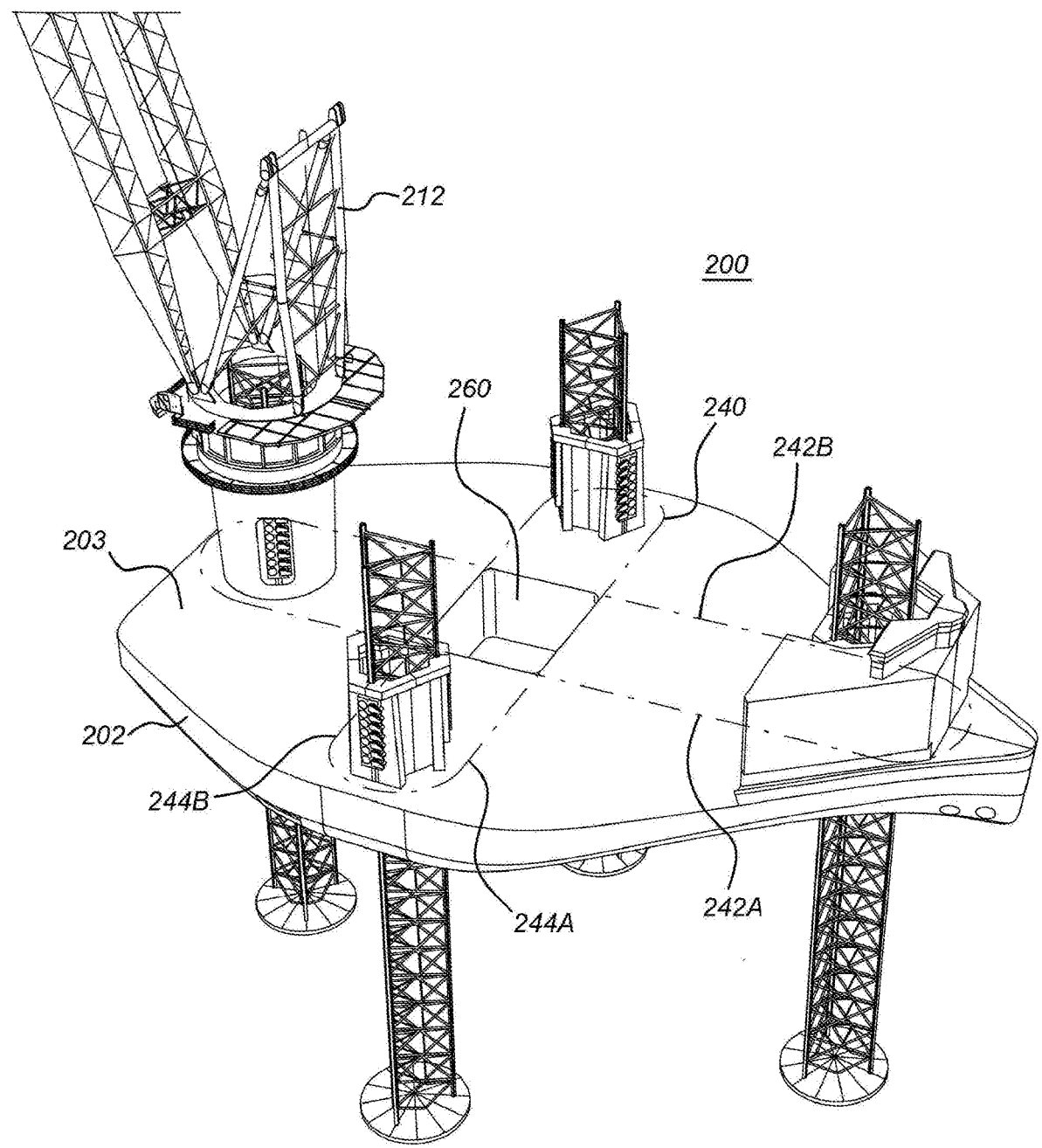
FIG. 8 schematically depicts a perspective view of an alternative embodiment of a jack-up vessel according to the invention.

FIG. 8, shows a vessel 200 according to an alternative embodiment of the invention. The vessel is generally similar to the vessel of the first embodiment and like elements are denoted by similar reference numerals preceded with 200.

According to this embodiment, the vessel 200 is provided with a moonpool 260, located at a position where the first and second parallel bulkheads 242 A, B and 244 A, B of the primary structure 240 intersect. The moonpool 260 extends through the deck 203 and hull 202 to the water below. The crane 212 can perform heavy lift operations through the moonpool 260 and can be used to install subsea constructions such as tidal turbines and the like. It will be understood that while the illustrated embodiment is based around a relatively small moonpool 260, an alternative primary structure 240 could provide a larger moonpool.

Other Embodiments

The present invention may be embodied in other specific forms without departing from its scope. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

The invention claimed is:

1. A self-propelled jack-up vessel, wherein a centerline extending from a bow end to a stern end of the vessel along a central longitudinal axis defines port and starboard sides of the vessel, and wherein the centerline substantially defines the direction of travel of the vessel, the vessel comprising: a hull, a deck and four retractable legs each fitted with a spud can to support the respective leg on a seafloor, the legs extending through the hull and the deck and arranged to be lowered onto the seafloor to support the vessel in an elevated position, including a bow leg arranged on the centerline towards the bow; a stern leg arranged on the centerline towards the stern; a port leg arranged at the port side; a starboard leg arranged at the starboard side.

2. The vessel according to claim 1, wherein a primary propulsion system is configured to drive the vessel in the direction of the centerline.

3. The vessel according to claim 1, wherein the spud cans each have a lower surface arranged to lie flush with the hull of the vessel in a retracted state of the respective leg.

4. The vessel according to claim 1, wherein the port and starboard legs are arranged symmetrically to the centerline such that the four legs form a kite or rhombus shape.

5. The vessel according to claim 4, wherein the geometrical arrangement of the legs defines the four corners of a square.

6. The vessel according to claim 4, wherein a ratio of a maximum width of the hull to a length of the hull is more than 0.5 but less than 1.

7. The vessel according to claim 4, further comprising a crane arranged on the centerline, wherein a crane base of the crane is arranged around the stern leg.

8. The vessel according to claim 7, wherein the crane comprises a crane boom and a crane boom pivot point is located above deck level.

9. The vessel of claim 4, comprising a cruciform primary structural arrangement between the hull and the deck, with at least one longitudinal structural bulkhead running between the bow leg and the stern leg and at least one transverse structural bulkhead running between the port leg and the starboard leg.

10. The vessel according to claim 4, wherein a center of buoyancy of the vessel is located substantially along a vertical axis intersecting the center of the leg pattern.

11. The vessel according to claim 4, further comprising a moonpool passing through the hull of the vessel, wherein the moonpool is located at the center of buoyancy of the vessel.

12. A method of operating a jack-up wind turbine installation vessel comprising;
at a first installation location, jacking the vessel by:
lowering a first pair and second pair of retractable legs onto the seafloor;
applying a pre-load, maximally equal to the full weight of the vessel, on said first pair of retractable legs aligned with a first axis of the vessel;
releasing the pre-load applied on the first pair of retractable legs;
applying the pre-load on a second pair of retractable legs aligned with a second axis of the vessel, and releasing the pre-load applied on the second pair of retractable legs, wherein the first and second axes are centerline of the vessel and a beam of the vessel.

13. The method of claim 12, further comprising moving the vessel to a second installation location, the vessel moving in a direction of its centerline, and jacking the vessel without taking on additional ballast.

14. The method according to claim 12, further comprising, prior to arriving at the first installation location, mooring the vessel at a quay with one of its stern quarters at the quayside and loading wind turbine components onto a deck of the vessel.

15. The method according to claim 14, wherein a crane having a lifting capacity exceeding 140 tons is provided at a stern of the vessel and loading takes place at least partially by the crane.

16. The method according to claim 15, wherein loading takes place without pre-loading the legs.

17. A self-propelled jack-up vessel having a hull and a deck and a cruciform primary structure wherein the cruciform primary structure comprises a first member defining a centerline of the vessel and a second member defining a beam of the vessel, wherein the first members comprises at least one longitudinal structural bulkhead between the hull and the deck and the second member comprises at least one transverse structural bulkhead between the hull and the deck wherein a length ratio of the second member to the first member is more than 0.5 but less than 1.

18. The vessel of claim 17, wherein the first and second members cross each other at right angles at a center of buoyancy of the vessel.

19. The vessel of claim 18, wherein each of the first and second members comprise first and second parallel bulkheads, and wherein the vessel is provided with four retractable legs, wherein the bulkheads encircle respective legs.

20. The vessel according to claim 17, wherein a moonpool is provided at the center of buoyancy of the vessel.

* * * * *